J. E. DE BAUN.
AIRSHIP.
APPLICATION FILED NOV. 6, 1911.

1,070,782.

Patented Aug. 19, 1913.

3 SHEETS—SHEET 3.

Witnesses:

Inventor
J. E. De Baun
By his Attorneys

UNITED STATES PATENT OFFICE.

JOHN E. DE BAUN, OF SPRING VALLEY, NEW YORK.

AIRSHIP.

1,070,782.   Specification of Letters Patent.   Patented Aug. 19, 1913.

Application filed November 6, 1911. Serial No. 658,820.

*To all whom it may concern:*

Be it known that I, JOHN E. DE BAUN, a citizen of the United States, and a resident of Spring Valley, county of Rockland, and State of New York, have invented certain new and useful Improvements in Airships, of which the following is a full, clear, and exact description.

This invention relates more particularly to an air-ship in which mechanism is employed for propelling and controlling the ship in its flight.

The primary object of the invention is to provide an air-ship in which mechanism is provided to adapt the ship in its flight to be controlled and to be positively propelled in various directions, and which has a plurality of movable wings or devices so constructed and arranged that the said wings may be made to assist in the movement of the ship and to sustain the same during its various movements.

Another object of the invention is to provide a simple, light and strong air-ship which is adapted to have a motor so arranged as to move the different propelling means.

A further object of the invention is to provide an air-ship or machine that in case of accident or for other reasons may float upon the water, and to provide a machine that may be used as a hydroplane.

With these and other objects in view, the invention will be hereinafter more particularly described with reference to the accompanying drawings, which form a part of this specification, and will then be pointed out in the claims at the end of the description.

Figure 1:
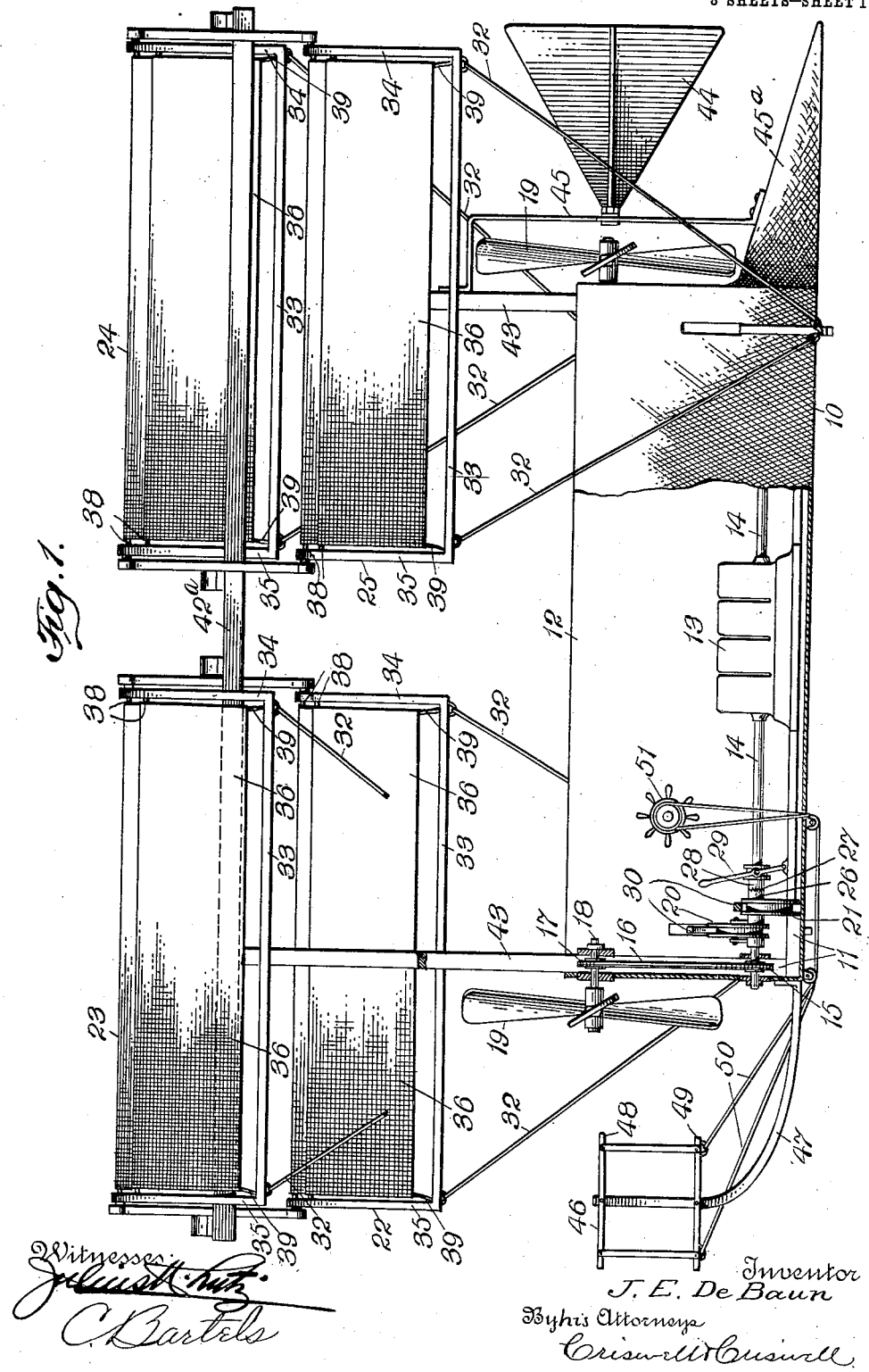
Figure 2:
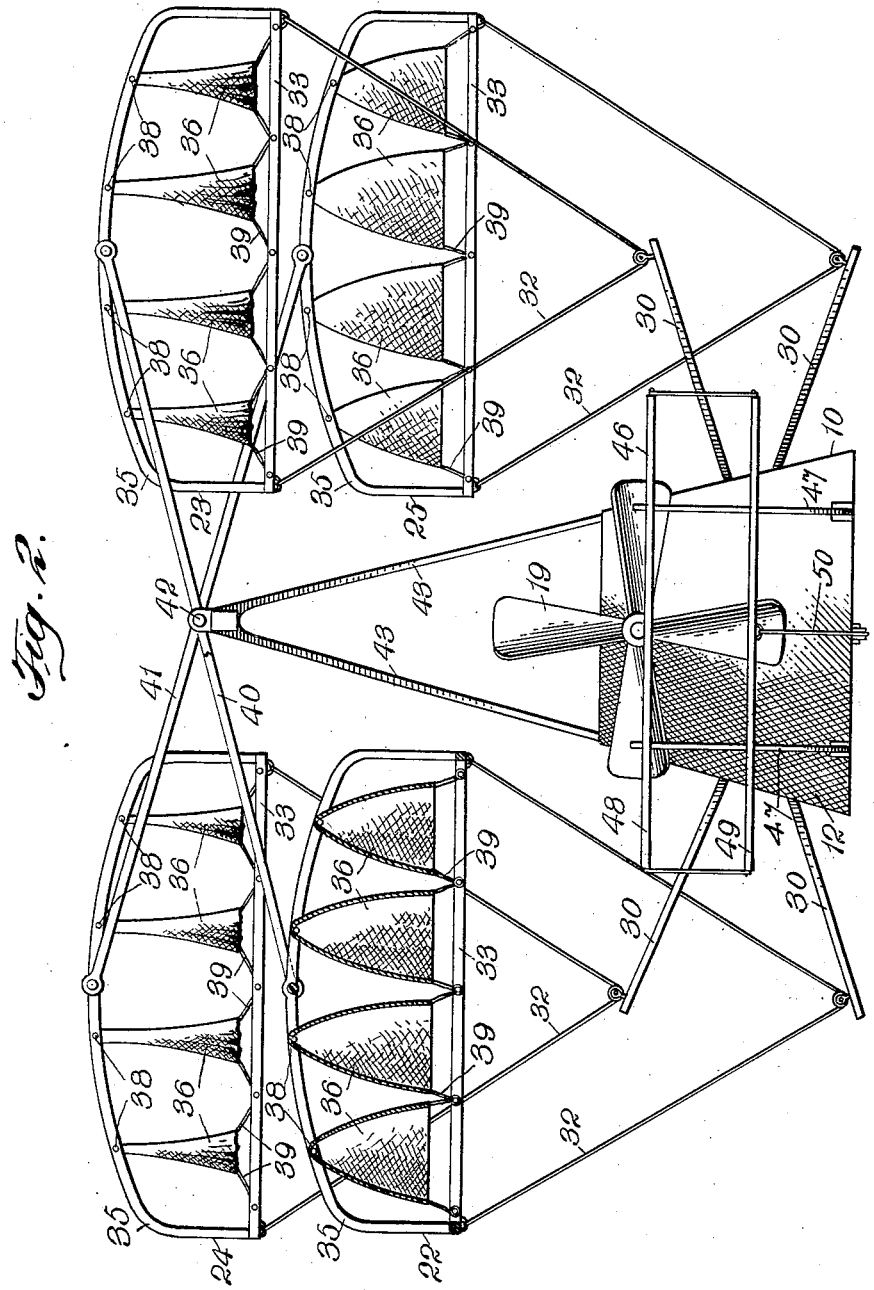
Figure 3:
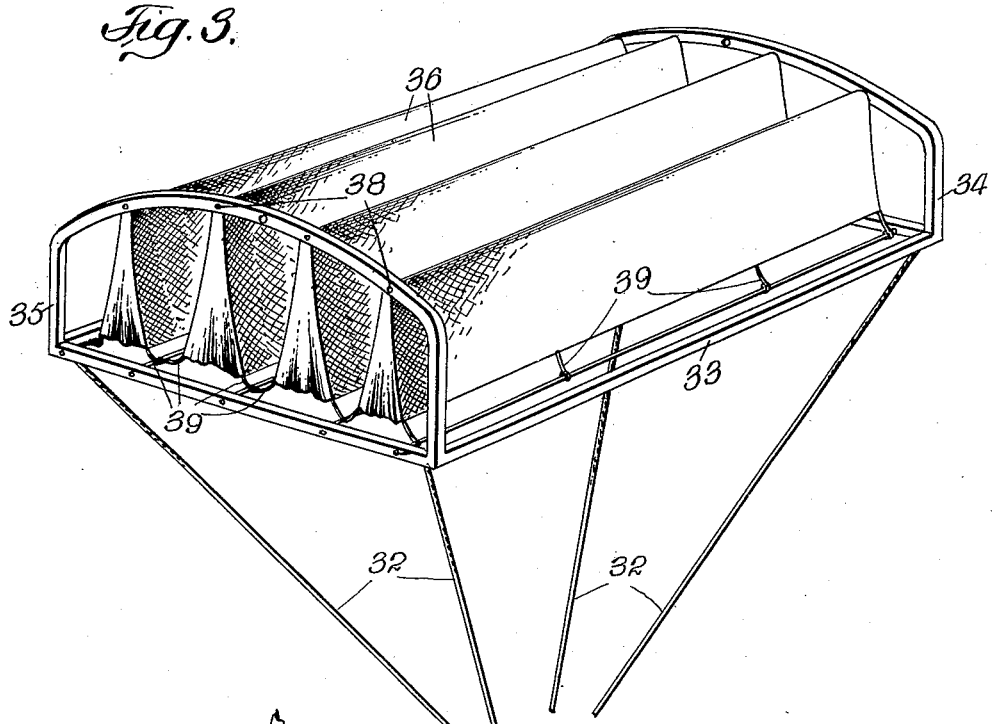
Figure 4:
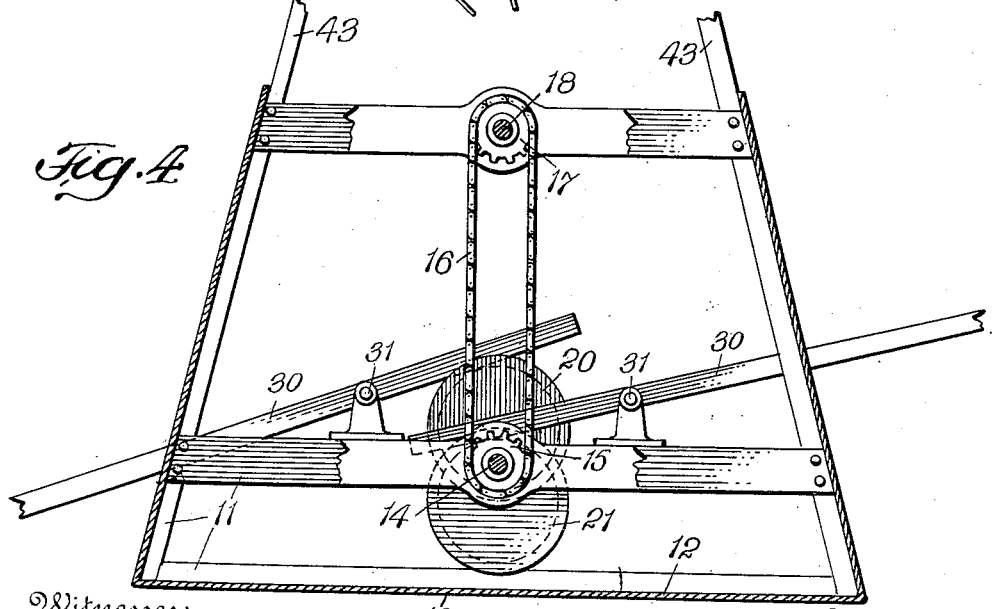

In the drawings, Figure 1 is a side elevation, partly in section and partly broken away, of one form of ship or machine embodying my invention. Fig. 2 is a front elevation. Fig. 3 is a detail perspective view of one of the wings or devices for elevating the ship; and Fig. 4 is an enlarged fragmentary transverse section showing a part of the operating mechanism.

The body or cage 10 may be of any suitable form or construction. As shown it comprises a light and strong frame 11, suitably braced, and inclosing this frame is a canvas or other covering 12 which may be made waterproof and which is adapted to extend any desired height along the sides of the frame so that the body will float on water in case of accident or for other reasons.

A motor 13 of any suitable kind, whether gasolene, electric or other make may be arranged within the body 12 and suitably supported on the frame, and extending outward from each side of the motor is the shaft 14. The ends of the shaft are journaled in the frame, and at or near the ends are sprocket wheels 15 around which pass chains 16 which are adapted to rotate the sprocket wheels 17 carried by shafts 18 which are located at the front and rear of the body. On each shaft 18 is a propeller 19, and these propellers may be rotated at any desired speed to propel the ship or machine.

To assist in elevating the machine and to control the same in its flight, I may arrange at or near each end of the shaft 14 a plurality of eccentrics 20 and 21 which are adapted to operate the wings or devices 22, 23, 24 and 25. Various means may be employed for operating the wings or devices, and said devices may be variously constructed. The eccentrics 20 and 21 may be secured to a sleeve 26, and one end of this sleeve, as 27, may be formed as a clutch member and adapted to engage the clutch member is a second member 28 which is operatively connected to a lever 29 so that said clutch members may be engaged or disengaged at will and thereby cause the eccentrics 20 and 21 to remain stationary or to rotate with the shaft 14 as desired. A lever 30 one for each eccentric is pivoted at 31 to the frame 11, and has one end arranged in the path of movement of the eccentric so as to be moved on its pivot when said eccentric is operated, and the other end of each lever 30 is connected by cables, ropes or other connections 32 to one of the devices or wings. These connections are so arranged that they will hold the wings or devices in substantially a horizontal position and will move the same upward and downward as said levers are operated by the eccentrics as will be presently described.

The devices may be of any desired number, and said devices may be arranged in pairs, one pair as 22 and 23 being at the forward part of the body and the pair 24 and 25 at the rear thereof. These devices are so connected to their operating mechanism that when one device of the forward pair is in its lowermost position, the opposite one of the rear pair is in a similar position as shown best in Fig. 2, thus serving better to balance and sustain the ship in its flight.

Each device or wing may be substantially rectangular in form and is provided with a light and strong frame 33 having the arched members 34 and 35 at the rear and the forward part thereof, and extending between said members 34 and 35 of each frame are a plurality of flexible members 36. These members 36 have a bag-like form to provide pockets and have a parachute effect on the air in the downward movement of the wings or devices, and said devices are adapted to collapse to offer less resistance to the air during the backward or upward movement of said devices. Each collapsible member or part 36 may be formed of canvas or other material, and may be suspended at the upper portion thereof from a rod 38 extending between the frame members 34 and 35, and the lower or open part thereof may be connected at its ends by a flexible connection 39 to limit the outward spreading movement of the sides of the parts or members 36, but which will permit the members to collapse during the upward movement of said wings. It will be seen, therefore, when the motor is operated, the eccentrics will operate the levers 30, and these levers will move the wings or devices 22 and 25 upwardly and downwardly, one lever serving to force one wing downward, while the other lever of the pair serves to force the other member downward, the devices being so positioned that when the wing 22 is down, the wing 23 is in its uppermost position, while the wing 25 has had a downward movement given thereto. The wings or devices are supported by the levers 40 and 41. These levers are pivoted at 42 to a longitudinally-extending bar 42ª which is held to the uprights or standards 43, and the levers 40 are pivotally connected at their outer ends to the frame members of the wings or devices 22 and 23, while the levers 41 are pivotally connected at their outer ends to the frame members of the wings or devices 24 and 25.

As a means to steer the ship or device, I may provide a suitable rudder 44 at the rear of the body, and this rudder may be supported by a bracket or brace 45 having one end connected to one of the uprights 43, and its other end supported on an extension 45ª projecting rearwardly from the cage or body 10, and this rudder may be under the control of the operator in any desired way, and by the movement of said rudder the body may be steered laterally in either direction. In the forward part of the ship may be suspended a device 46. This device may be held to a support 47 and may comprise an upper pivoted member 48, and a lower pivoted member 49 so connected by links that when the members are moved on their pivots the resistance offered to the air will tend to elevate or lower the forward part of the ship, and by means of the propellers 19 may be caused to move either upward or downward either in conjunction with or independent of the wings or devices 22 and 25. The device 46 may be connected by ropes 50 or otherwise to a steering drum 51 so that by rotating said drum the device 46 may be moved in either direction for steering purposes.

In addition to the features shown any of the well-known parts of the usual areoplane may be employed in connection with some of the features of the invention or as a substitute therefor.

From the foregoing, it will be seen that a simple, compact, light and strong air-ship or machine is provided which is adapted to be under the absolute control of an attendant; that mechanism is arranged whereby devices may be operated to cause said devices to assist in elevating and sustaining the air-ship or machine in its flight; that said machine has its body so made as to float on the water or to move and be propelled in the air, and that simple and efficient steering and propelling mechanism is provided for the machine.

It is to be understood that the word "body" may include the part which adapts the ship to float on the water or may indicate any suitable support or framework.

Having thus described my invention, I claim as new and desire to secure by Letters Patent:—

1. The combination with a body, of propelling mechanism, means for steering said body, a plurality of devices serving as wings and each provided with a plurality of open ended flexible bag like members, means for suspending the devices in pairs, and means for operating said devices so that the oppositely located device of each pair will have the same movement in order to balance the body of the machine.

2. The combination with a body, of propelling mechanism, means for steering said body, a plurality of movable devices serving as wings, and each provided with elongated open ended flexible bag-like means adapted to spread apart during one movement and to collapse during the reverse movement, means for suspending the devices, and means for operating said devices so that the oppositely arranged devices of each pair will have the same movement in order to balance the body of the machine.

3. The combination with a body, of a plurality of upwardly and downwardly moving devices having flexible bag-like means thereon said bag like means being open at the bottom and having a parachute effect on the air during the downward movement, means for supporting said devices, a plurality of levers one for each device, connections between the ends of said levers and the devices, means for operating the levers together with means for propelling the body forward.

4. An air-ship comprising a body, a drive shaft, a propeller located at the forward and rear of said body, means for operating the propellers from the drive shaft, a steering device located at the forward and rear of the body, a plurality of devices serving as wings and pivotally supported above the body on opposite sides thereof and arranged in pairs, and each device being provided with a plurality of flexible open ended bag-like members having means for limiting the spreading effect of said members, a lever for each device, means for operating said lever, and flexible connections between the lever and said devices adapted to hold the same normally in a horizontal position during the downward and upward movement thereof.

5. An air-ship comprising a body, a drive shaft, a propeller located at the forward and rear of said body, means for operating the propellers from the drive shaft, a steering means, a plurality of devices serving as wings pivotally supported on opposite sides thereof, and each device being provided with a plurality of flexible open ended bag-like members having means for limiting the spreading effect of said devices, a lever for each device, means for operating said lever, and flexible connections between each lever and its device adapted to hold the same normally in a horizontal position during the downward and upward movement thereof.

6. In an air-ship, a body, a plurality of substantially rectangular devices each having a frame and a plurality of flexible open ended bag-like members, means for pivotally supporting said devices, and means for imparting a vertical movement to the devices.

7. In an air-ship, the combination of a support, of a wing made in the form of a plane and provided with expanding and collapsible bag like members as a part thereof, and means for moving said planes.

This specification signed and witnessed this 25th day of October A. D. 1911.

JOHN E. DE BAUN.

Witnesses:
ALEX. H. MERRITT,
CORA L. ABRAMS.

---

Copies of this patent may be obtained for five cents each, by addressing the "Commissioner of Patents, Washington, D. C."